(12) United States Patent
Peterson

(10) Patent No.: US 11,518,159 B2
(45) Date of Patent: Dec. 6, 2022

(54) LAMINATE FOAM AND METHODS OF MAKING LAMINATE FOAM

(71) Applicant: NOVATION IQ LLC, Lenexa, KS (US)

(72) Inventor: Michael Peterson, Shawnee, KS (US)

(73) Assignee: NOVATION IQ LLC, Lenexa, KS (US)

( * ) Notice: Subject to any disclaimer, the term of this patent is extended or adjusted under 35 U.S.C. 154(b) by 0 days.

(21) Appl. No.: 16/538,413

(22) Filed: Aug. 12, 2019

(65) Prior Publication Data

US 2019/0358931 A1 Nov. 28, 2019

Related U.S. Application Data

(62) Division of application No. 15/666,361, filed on Aug. 1, 2017, now abandoned.

(Continued)

(51) Int. Cl.
*B32B 37/06* (2006.01)
*B32B 5/18* (2006.01)
(Continued)

(52) U.S. Cl.
CPC ............ *B32B 37/06* (2013.01); *B29C 65/103* (2013.01); *B29C 65/106* (2013.01);
(Continued)

(58) Field of Classification Search
CPC ..... B29C 65/10; B29C 65/103; B29C 65/106; B29C 66/45; B29C 66/1122; B29C 66/41;
(Continued)

(56) References Cited

U.S. PATENT DOCUMENTS 3,117,211 A * 1/1964 Tansey ...................... B26F 3/12
83/171
5,882,776 A * 3/1999 Bambara ................ B65D 5/509
428/215

(Continued)

FOREIGN PATENT DOCUMENTS

| WO | WO-03039870 A1 | * | 5/2003 | ........... B29C 66/729 |
| WO | WO-2013169290 A1 | * | 11/2013 | ................ B32B 5/18 |
| WO | WO-2015164512 A1 | * | 10/2015 | ................ C02F 1/40 |

OTHER PUBLICATIONS

"Non Final Office Action Received for U.S. Appl. No. 15/666,361 dated Mar. 11, 2019, 9 pages".

*Primary Examiner* — John L Goff, II
(74) *Attorney, Agent, or Firm* — Kulak Rock LLP

(57) ABSTRACT

A method of making laminate foam material is provided. The laminate foam material includes a layer of non-foam material sandwiched between two layers of foam material. The non-foam material is bonded to the foam material, such as with a bonding agent and/or by heating respective surfaces of the foam material until the surface softens or melts. When a heating process is utilized, the non-foam material is pressed against the softened or melted foam material. As the foam material begins to cool, the non-foam material becomes bonded to the foam material. The non-foam material is narrower than the foam material and is positioned relative to the foam material such that the edges of the non-foam material are concealed by the foam material. Foam products, such as foam mats, can be formed from the laminate foam material by cutting across the width of the foam material.

17 Claims, 2 Drawing Sheets

Related U.S. Application Data

(60) Provisional application No. 62/369,549, filed on Aug. 1, 2016.

(51) Int. Cl.

| | | |
|---|---|---|
| *B32B 3/02* | (2006.01) | |
| *B32B 37/10* | (2006.01) | |
| *B29C 65/00* | (2006.01) | |
| *B32B 37/04* | (2006.01) | |
| *B29C 65/10* | (2006.01) | |
| *B32B 37/20* | (2006.01) | |
| *B63B 34/50* | (2020.01) | |

(52) U.S. Cl.
CPC .......... *B29C 66/1122* (2013.01); *B29C 66/41* (2013.01); *B29C 66/45* (2013.01); *B29C 66/727* (2013.01); *B32B 3/02* (2013.01); *B32B 5/18* (2013.01); *B32B 37/04* (2013.01); *B32B 37/10* (2013.01); *B29C 66/3034* (2013.01); *B29C 66/30341* (2013.01); *B29C 66/71* (2013.01); *B32B 37/203* (2013.01); *B32B 2305/022* (2013.01); *B32B 2307/54* (2013.01); *B63B 34/50* (2020.02)

(58) Field of Classification Search
CPC . B29C 66/727; B29C 66/30341; B29C 66/71; B29C 66/3034; E02B 15/101; A63H 23/10; B63B 34/00; B63B 34/50; B32B 3/02; B32B 5/18; B32B 5/024; B32B 5/245; B32B 5/028; B32B 5/32; B32B 37/04; B32B 37/06; B32B 37/10; B32B 37/203; B32B 2305/022; B32B 2307/54; B32B 2307/732; B32B 2307/72; B32B 2262/0276; B32B 2262/0253; B32B 2266/0278; Y10T 156/108; Y10T 156/1084; Y10T 156/1087
See application file for complete search history.

(56) References Cited

U.S. PATENT DOCUMENTS

| | | |
|---|---|---|
| 2009/0186540 A1 | 7/2009 | Pole, III et al. |
| 2013/0240451 A1* | 9/2013 | Curtis, Jr. ................ C08J 9/36 210/675 |
| 2017/0159255 A1 | 6/2017 | Smith |
| 2018/0029327 A1 | 2/2018 | Peterson |

\* cited by examiner

LAMINATE FOAM AND METHODS OF MAKING LAMINATE FOAM

CROSS-REFERENCE TO RELATED APPLICATIONS

This application is a divisional application which claims priority pursuant to 35 U.S.C. 120 of U.S. patent application Ser. No. 15/666,361, filed Aug. 1, 2017, now abandoned, the entire disclosure of which is incorporated herein by reference, which claims priority to U.S. Provisional Patent Application Ser. No. 62/369,549, filed Aug. 1, 2016, the entire disclosure of which is incorporated herein by reference.

FIELD OF THE INVENTION

The present invention relates generally to laminate foam material and associated laminate foam products. More specifically, the present invention is concerned with methods of fabricating laminate foam material.

BACKGROUND OF THE INVENTION

Laminate foam material is used for a variety of products, including foam mats and foam flotation devices. Laminate foam material is fabricated by bonding multiple layers of foam together. Flame lamination is one method of bonding foam material together.

Flame lamination involves heating the surface of the foam material, such as with an open flame, to soften and/or melt the surface of the foam material. Two pieces of foam material are then pressed together while their respective surfaces are still hot. As the surfaces cool, a bond is formed. Unfortunately, the bonds created are not always sufficient for every application. For instance, in some applications, such bonds can fail, causing delamination. One such instance involves the use of laminate foam as flotation devices. In such instance, multiple layers (often two) of foam material approximately ½ inch to 1 inch each in thickness are flame laminated together to form a mat, often of sizes in the range of five to ten feet (or more) in width and ten to twenty feet (or more) in length. Some such mats, often referred to as lake mats and/or lake pads, are tied up next to a dock or boat, or tied to an anchor and allowed to float in a lake or other body of water and used as a swim platform for entertainment purposes. Often swimmers will jump from a boat or dock onto the mat, and the foam material and/or bond will break apart. Personal-size floatation mats formed from smaller sizes of the same or similar material can also break apart from use and/or abuse by a user. Consequently, it would be beneficial to have alternative laminating processes. Furthermore, it would be beneficial to have stronger bonds so that the laminate foam material will be less likely to delaminate and/or to provide a laminate foam composition that is stronger than those of the prior art.

The lake pad/mat market is driven by the competing factors of durability and cost. Consumers want a low-cost option, but they do not want the pad/mat to tear or rip. Unfortunately, existing low-cost alternatives, such as those that use two layers of 2# or 3# density ⅝" thick foam bonded together to make a 1.25" thick mat, are more susceptible to tears or rips than some consumers and manufacturers would like, leading to rejection rates as high as 10%. Consequently, it would be beneficial to have a low-cost alternative that is less susceptible to tears and rips so that the rejection rate can be reduced without significantly increasing the cost of the product.

SUMMARY OF THE INVENTION

The present invention comprises a superior laminate foam material for use in forming a laminate product and a method of making the same. In some embodiments, such as shown in FIG. 3, the foam material includes a first layer of foam material, a second layer of foam material, and a first layer of non-foam material that is bonded there-between. It will be understood that in some embodiments the layer of non-foam material is formed from a foam material having different properties from one or more layer of foam material. In some such embodiments, the layer of non-foam material is formed from a foam material having high tensile strength while one or more layer of the foam material is formed from a foam material having lower tensile strength.

In some embodiments, the layer of non-foam material extends substantially between opposed first and second ends of the foam material. In this way, the entire length of the foam material is bonded to the non-foam material. In some embodiments, the non-foam material extends partially from a first side of the first layer of foam material to a second side of the first layer of foam material.

In some embodiments, a second layer of foam material is bonded to the first layer of foam material and to the non-foam material such that the non-foam material is secured between the first and second layers of foam material. In some embodiments, the second layer of foam material is substantially the same width as the first layer of foam material but wider than the non-foam material. In some such embodiments, such as shown in FIG. 3, the non-foam material is displaced from opposed sides of the foam material such that the foam material defines opposed first and second strips of material where the first and second layers of foam material are bonded directly to each other and a center strip of material positioned between the first and second strips of material in which the first and second layers of foam material are each bonded to the non-foam material. In this way, the edges of the non-foam material are concealed by the foam material, thereby reducing risk of damage to, injury from, and/or otherwise associated with the non-foam material.

In some embodiments, the laminate foam material includes one or more additional layer of foam material bonded to the first piece of foam material such that the first piece of foam material is positioned between the additional piece of foam material and the second piece of foam material. In some such embodiments, an additional piece of non-foam material is positioned between the first piece of foam material and the additional piece of foam material. In other embodiments, a plurality of pieces of foam material are bonded together. In some such embodiments, a piece of non-foam material is positioned between at least some of the plurality of pieces of foam material.

The present invention further includes a method of making laminate foam material for forming a laminate product of the present invention. In some embodiments, a bonding agent is utilized to bond one or more layer of the laminate material to an adjacent layer of the laminate material. In some embodiments, a top surface of a first piece of foam material is heated, such as with an open flame, so as to create a thin layer of softened and/or melted foam material. A first layer of non-foam material is then pressed against the top surface of the first piece of foam material so as to bond the first piece of non-foam material to the top surface of the first piece of foam material. In some such embodiments, a bottom surface of the second piece of foam material is heated and pressed against the top surface of the first pieces of foam and non-foam material so as to bond the first and second pieces of foam material together with the first piece of non-foam material bonded there between. In some such embodiments, the first and second pieces of foam material are heated simultaneously or nearly simultaneously such that the top surface of the first piece of foam material and the bottom surface of the second piece of foam material are each softened and/or melted when the first and second pieces of foam material are pressed together.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

FIG. 3 is an end view of a laminate material having first and second layers of foam and a layer of non-foam material bonded there between.

FIG. 4 is a perspective view of a laminate product having two foam layers and a single non-foam layer posited there between.

DETAILED DESCRIPTION

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
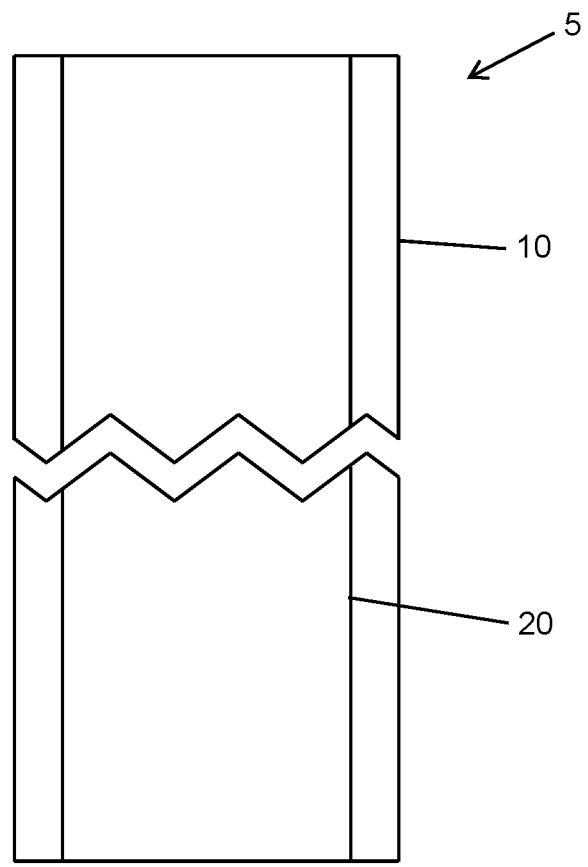
FIG. 1 is a top view of a laminate material having a first layer of foam and a layer of non-foam material bonded thereto.
Figure 2:
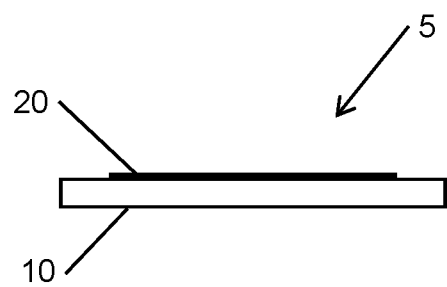
FIG. 2 is an end view of the laminate material of FIG. 1.
Figure 3:
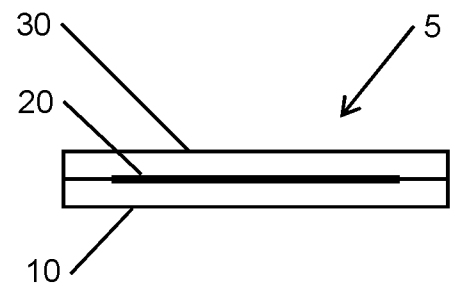

Referring to FIGS. 1-5, the present invention is a laminate material 100 for forming a laminate product 100 and a method of making the same. As shown in FIGS. 1 and 2, the laminate material 5 includes a first layer 10 bonded to a second layer 20. In other embodiments, as shown in FIG. 3, the laminate material 5 further includes a third layer 30 bonded to the first 10 and/or second 20 layer. In some embodiments, the second layer 20 is positioned between the first 10 and third 30 layers and is bonded to each. In some such embodiments, the first 10, second 20, and third 30 layers are formed from materials and/or are bonded in such a way that bonding the second 20 layer between the first 10 and third 30 layers creates a laminate material 5 having superior properties over a laminate material formed from the first 10 layer being bonded to the third 30 layer without the second 20 layer bonded there between.

Figure 4:
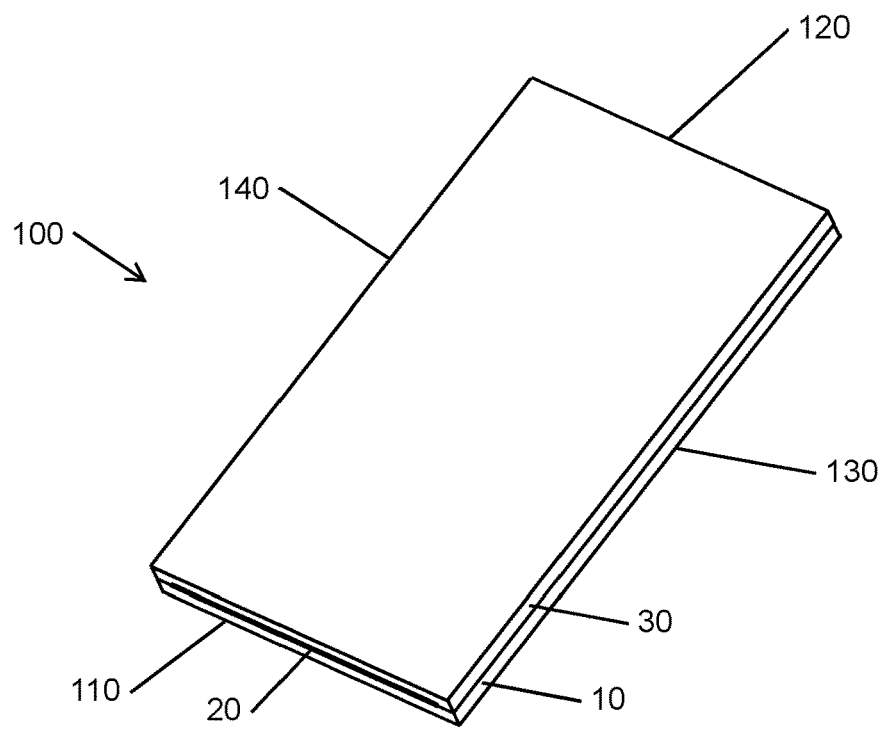
Figure 5:
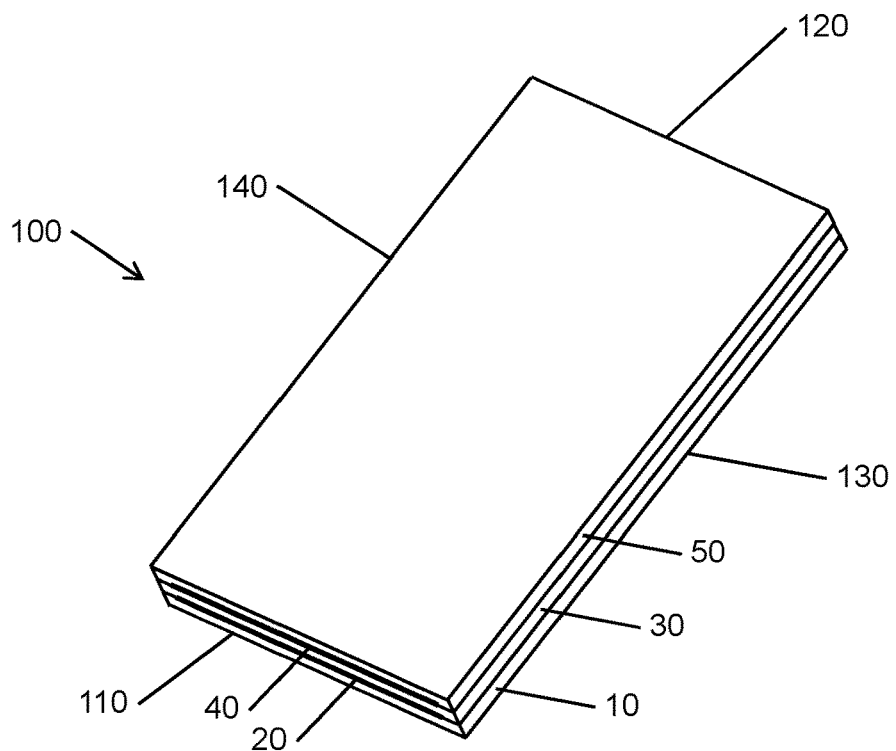
FIG. 5 is a perspective view of a laminate product having three foam layers and two non-foam layers, each non-foam layer being positioned between two foam layers.

Referring to FIGS. 4 and 5, the laminate product 100 includes opposed first 110 and second 120 ends defined by respective first and second ends of the first 10 and/or third 30 layer. In some embodiments, the second layer 20 extends substantially between opposed first 110 and second 120 ends of the laminate product 100. In this way, the entire length of the second layer 20 is capable of being bonded to at least one of the first 10 and third 30 layers.

In some embodiments, the laminate product 100 further includes opposed first 130 and second 140 edges extending between opposed first 110 and second 120 ends of the laminate product. In some embodiments, a first edge of the second layer 20 is displaced from the first edge 130 of the laminate product 100, thereby defining a first edge region in which the first 10 and third 30 layers are capable of being bonded directly to each other. In other embodiments, first and second edges of the second layer 20 are each displaced from respective first 130 and second 140 edges of the laminate product 100, thereby defining respective first and second edge regions in which the first 10 and third 30 layers are capable of being bonded directly to each other. In some such embodiments, the first edge region has a width that is substantially equal to a width of the second edge region.

In some embodiments, at least one of the first 10 and third 30 layers is formed from a material having good flotation properties. In this way, the first 10 and/or second 30 layer is configured to cause the laminate product 100 to be buoyant, thereby allowing the laminate product 100 to be used with and/or as a flotation device, such as a lake pad. In some embodiments, the first 10 and third 30 layers are each formed from a polymer material, such as polyurethane.

In some embodiments, the second layer 20 is formed from a material having good durability properties. In this way, the second layer 20 is configured to prevent and/or resist tearing and/or puncturing of the laminate product 100.

In some embodiments, the second layer 20 is formed from a polyethylene, such as woven polyethylene. In some embodiments, the second layer 20 is formed from a polyester mesh. In some embodiments, the second layer 20 is formed from a 7 ounce poly (7 ounces per square yard) material having a 12 by 11 weave, such as a 1500 denier scrim with 2.5 mils black UV coating on each side. In some embodiments, the second layer 20 is formed from a 12 ounce poly (12 ounces per square yard) material having a 14 by 16 weave, such as a 2000 denier scrim with 3.5 mils black UV coating on each side. In some embodiments, the second layer is formed from a 6-8 mil PE film or a 600 denier pure nylon.

In some embodiments, the laminate product 100 has a width of between 70 and 75 inches and a length of between 135 and 800 feet. In some embodiments, each of the first 10 and third 30 layers has a width substantially equivalent to the width of the laminate product 100 such that opposed first and second edges of the first layer 10 substantially align with respective opposed first and second edges of the third layer 30. In some embodiments, the second layer 20 has a width of approximately 65 inches.

In some embodiments, the second layer 20 has a thickness that is substantially less than a thickness of the first layer 10. In some embodiments, the first 10 and/or third 30 layer is formed from a material having a thickness of 0.35" with a 3# density, a ⅝" thickness with a 2# or 3# density, a 0.7" thickness with a 2# density, and/or a ¾" thickness with a 2.1# density. In some such embodiments, the first 10 and third 30 layers each has a thickness of ⅝" and the second layer 20 has a thickness that is substantially less than ⅝" such that the laminate product 100 has a total thickness of approximately 1.25". In other embodiments, one of the first 10 and third 30 layers has a thickness of ⅝", the other of the first 10 and third 30 layers has a thickness of 0.70" or 0.75", and the second layer has a thickness that is substantially less than the thickness of either of the first 10 and third 30 layers such that the laminate product 100 has a total thickness of approximately 1.325 or 1.375, respectively. In still other embodiments, the first 10 and third 30 layers each has a thickness of 0.70" and the second layer 20 has a thickness that is substantially less than 0.70" such that the laminate product 100 has a total thickness of approximately 1.40". In some embodiments, the first 10 and/or third 30 layer is formed from a material that is red, orange, yellow, or blue.

It will be appreciated that the first 10 and third 30 layers are formed from a material of a group of materials generally referred to as "foam" materials and that the second layer 20 is formed from a material of a group of materials generally referred to as "non-foam" materials. In some embodiments, the volume of foam materials is substantially greater than the volume of non-foam materials such that the density of the present invention is substantially equivalent to the density of the foam materials. It will be appreciated that some embodiments of the present invention include various layer configurations and that various layers of such embodiments include various properties, including different thicknesses, densities, colors, materials, and the like.

In some embodiments, the laminate product 100 further includes a fourth layer (not shown) made from a foam material. In some such embodiments, the foam material of the fourth layer is substantially similar to the material of the first 10 or third 30 layer. In some embodiments, a fourth layer formed from foam material is bonded to the third layer 30 such that the third layer 30 is positioned between the fourth layer and the second layer 20.

Referring to FIG. 5, some embodiments of the laminate product 100 further include a fourth layer 40 made from a non-foam material. In some such embodiments, the non-foam material of the fourth layer is substantially similar to the material of the second layer 20. In some embodiments, the laminate product 100 further includes a fourth layer 40 formed from a non-foam material and a fifth layer 50 formed from a foam material. In some such embodiments, the fourth layer 40 is bonded to the third layer 30 and the fifth layer 50 is bonded to the fourth layer 40 such that the non-foam material of the fourth layer 40 is positioned between the foam material of the third 30 and fifth 50 layers. In some such embodiments, the fifth layer 50 has a width that is substantially equivalent to a width of the third layer 30 and the fourth layer 40 has a width that is measurably less than the width of the third 30 and fifth 50 layers such that centering the fourth layer 40 with the third 30 and fifth 50 layers creates opposed first and second edge regions in which the fifth layer 50 is capable of being bonded directly to the third layer 30. It will be appreciated that, in other embodiments, the laminate product 100 includes a plurality of layers of foam material bonded directly to an adjacent layer of foam material and/or bonded to a layer of non-foam material positioned there between.

In some embodiments, each of three layers of foam material of a laminate product 100 has a thickness of ⅝" and each of one or more layer of non-foam material has a thickness substantially less than ⅝" such that the laminate product 100 has a total thickness of approximately 1.87". In other embodiments, one of three layers of foam material of a laminate product 100 has a thickness of 0.75", each of the other two layers of foam material of the laminate product 100 has a thickness of 0.35" or ⅝", and each of one or more layer of non-foam material of the laminate product 100 has a thickness substantially less than the thickness of each layer of foam material such that the laminate product 100 has a total thickness of between approximately 1.45" and 2.00".

The present invention further includes a method of making the laminate product 100 of the present invention. In some embodiments, a bonding agent is utilized to bond one or more layer of the laminate material to an adjacent layer of the laminate material. In some embodiments, a top surface of a first piece of foam material is heated, such as with an open flame, so as to create a thin layer of softened and/or melted foam material. A first piece of non-foam material is then pressed against the top surface of the first piece of foam material so as to bond the first piece of non-foam material to the top surface of the first piece of foam material, thereby creating a first 10 and second 20 layer of the laminate product 100 formed from a foam material and a non-foam material, respectively. In some embodiments, the method further includes heating a bottom surface of a second piece of foam material, such as with an open flame, so as to create a thin layer of softened and/or melted foam material and pressing the first and second pieces of foam material together so as to bond the first and second pieces of foam material together with the first piece of non-foam material bonded there between, thereby creating a laminated product 100 having first 10, second 20, and third 30 layers. In some such embodiments, the first and second pieces of foam material are heated simultaneously or nearly simultaneously such that the top surface of the first piece of foam material and the bottom surface of the second piece of foam material are each softened and/or melted when the first and second pieces of foam material are pressed together.

In some embodiments, the first piece of non-foam material is at least partially secured to at least one of the first and second pieces of foam material prior to the respective first or second piece of foam material being heated. In some such embodiments, the first piece of non-foam material is pressed against the top surface of the first piece of foam material prior to the top surface of the foam material becoming softened and/or melted. In other embodiments, the first piece of non-foam material is pressed against the bottom surface of the second piece of foam material prior to the bottom surface of the second piece of material being heated.

In some embodiments, a multi-burner flame laminator, such as a three burner flame laminator, is used to bond the foam material together. In some such embodiments, first and second flame bars are each angled relative to respective first and second foam layers as the first and second foam layers are heated simultaneously by respective first and second flame bars. In some such embodiments, one or more flame blocker is used relative to the first and/or second flame bar so as to redirect heat away from the non-foam layer as the first and second foam layers are being heated. In this way, a double-layer of foam material can be formed in one pass while the non-foam layer is protected from heat damage and/or deterioration associated with heat.

In some embodiments, triple-layer foam material and other foam material having more than two layers of foam material can be formed using a flame laminator. In some such embodiments, a first foam layer is heated by one or more flame bar/burner so that the non-foam layer can be bonded to the first foam layer. In some such embodiments, one or more flame blocker is used relative to the one or more flame bar/burner so as to redirect heat away from the non-foam layer as the first foam layer is being heated. In this way, the non-foam layer can be bonded to the first foam layer while protecting the non-foam layer from heat damage and/or deterioration associated with heat. In some embodiments, second and third foam layers are each heated by one or more flame bar/burner so that the second and third foam layers can be bonded to the first foam layer. In some such embodiments, one or more flame blocker is used with the one or more flame bar/burners so as to redirect heat away from the non-foam layer as the second and third foam layers are being heated.

In some embodiments, forming the foam product 100 includes cutting the laminate foam material along its entire width so as to create at least part of the foam product. In some embodiments, the material is further cut at one or more location along its length. In some such embodiments, the foam material has an original width of approximately 75 inches and is cut down to a width of between approximately 70 and 72 inches.

In some embodiments, cutting the laminate foam material along its width includes cutting the non-foam material such that the non-foam material is at least partially exposed at one or more end(s) of laminate product 100. In other embodiments, the non-foam material is sized and spaced and the process of cutting the material along its length is coordinated with the sizing and spacing of the non-foam material such that cutting the material along its length does not include cutting the non-foam material.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A method of forming a laminate material for forming a laminate product, the method comprising:
    heating a top surface of a first piece of foam material;
    pressing a first piece of non-foam material against the top surface of the first piece of foam material while the top surface is still at an elevated temperature;
    retaining the first piece of non-foam material in contact with the top surface of the first piece of foam material while the top surface is allowed to cool;
    heating a bottom surface of a second piece of foam material;
    pressing the second piece of foam material against the first piece of non-foam material while the bottom surface is still at an elevated temperature;
    retaining the bottom surface of the second piece of foam material in contact with the first piece of non-foam material while the bottom surface is allowed to cool;
    heating a top surface of the second piece of foam material;
    pressing a second piece of non-foam material against the top surface of the second piece of foam material while the top surface is still at an elevated temperature;
    retaining the second piece of non-foam material in contact with the top surface of the second piece of foam material while the top surface is allowed to cool;
    heating a bottom surface of a third piece of foam material;
    pressing the third piece of foam material against the second piece of non-foam material while the bottom surface is still at an elevated temperature;
    retaining the bottom surface of the third piece of foam material in contact with the second piece of non-foam material while the bottom surface is allowed to cool,
        wherein the first piece of foam material forms at least part of a first layer of the laminate material,
        wherein the first piece of non-foam material forms at least part of a second layer of the laminate material,
        wherein the second piece of foam material forms at least part of a third layer of the laminate material,
        wherein the second piece of non-foam material forms at least a part of a fourth layer of the laminate material, and
        wherein the third piece of foam material forms at least part of a fifth layer of the laminate material,
        wherein the first, second, and third pieces of foam material each have a thickness of 0.35 inches and 0.75 inches;
        wherein the total thickness of the first, second, third, fourth, and fifth layers is between 1.45 inches and 2 inches, and
        wherein the first, second, and third pieces of foam material have a pre-cut width of approximately 75 inches; and
    cutting said first, second, and third pieces of foam material to a post-cut width of approximately 70-72 inches.

2. The method of claim 1, wherein the step of heating the bottom surface of the second piece of foam material occurs after the first pieces of foam material and non-foam material are bonded together.

3. The method of claim 1, wherein each heating step and each pressing step occurs substantially contemporaneously with its respective heating or pressing step such that the piece of non-foam material is simultaneously bonded to each of the first and second pieces of foam material.

4. The method of claim 1, further comprising positioning the first piece of non-foam material relative to the first piece of foam material such that a first edge of the first piece of non-foam material is displaced from a first edge of the first piece of foam material, thereby forming a first edge region of the laminate material, the first edge region being devoid of the first piece of non-foam material.

5. The method of claim 4, further comprising positioning a first edge of the second piece of foam material so as to be substantially aligned with the first edge of the first piece of foam material such that the first edge region of the laminate material comprises a portion of each of the first and second pieces of foam material, thereby concealing the first edge of the first piece of non-foam material between the first and second pieces of foam material.

6. The method of claim 5, wherein a width of the second piece of foam material is substantially equivalent to an associated width of the first piece of foam material such that a second edge of the second piece of foam material is substantially aligned with a second edge of the first piece of foam material.

7. The method of claim 6, wherein the first piece of non-foam material is positioned relative to the first and second pieces of foam material such that a second edge of the first piece of non-foam material is displaced from associated second edges of the first and second pieces of foam material, thereby creating a second edge region of the laminate material, the second edge region being devoid of the first piece of non-foam material, thereby concealing the second edge of the first piece of non-foam material between the first and second pieces of foam material.

8. The method of claim 7, wherein the first piece of foam material is bonded directly to the second piece of foam material in at least one of the first and second edge regions of the laminate material, and wherein the cutting occurs in at least one of the first and second edge regions of the laminate material.

9. The method of claim 1 wherein the first, second, and third pieces of foam material each have a thickness of 0.35 inches.

10. The method of claim 1, wherein the first, second, and third pieces of foam material each have a thickness of 0.625 inches.

11. The method of claim 1, wherein the second and fourth layers have a width of approximately 65 inches.

12. The method of claim 11, wherein the second and fourth layers have a length which is less than the laminate product.

13. The method of claim 11, wherein the second and fourth layers have a length which is equal to the laminate product.

14. A method of forming a laminate product from a laminate material, the method comprising cutting the laminate material across an entire width of the laminate material so as to form first and second pieces of laminate material, the first piece of laminate material being sized to form a single laminate product and the second piece of laminate material being sized to form a plurality of laminate products, wherein the laminate material comprises:
  a first layer having opposed top and bottom surfaces;
  a second layer bonded to the top surface of the first layer;
  a third layer having opposed top and bottom surfaces, the bottom surface bonded to at least one of the second layer and the top surface of the first layer;
  a fourth layer bonded to the top surface of the third layer; and
  a fifth layer having a bottom surface bonded to at least one of the fourth layer and the top surface of the third layer,
    wherein the first, third, and fifth layers are each formed from a foam material having a width of approximately 75 inches,
    wherein the second and fourth layers are each formed from a non-foam material, and
    wherein a density of the laminate product is significantly less than the density of water; and
  the method further comprising cutting the laminate material along its length at a first edge region of the laminate material so as to form a first edge of the laminate product, the first edge region of the laminate material being defined at least partially by a portion of the first and third layers of the laminate material extending beyond a first edge of the second layer of the laminate material,
    wherein the resulting laminate product is approximately 70-72 inches wide.

15. The method of claim 14, wherein cutting the laminate material along its width includes cutting the second layer such that the second layer is at least partially exposed at one or more ends of the resulting first piece of laminate material.

16. The method of claim 14, wherein the second layer is sized and spaced, and the process of cutting the material along its length is coordinated with the sizing and spacing of the second layer, such that cutting the laminate material along its length does not include cutting the second layer.

17. The method of claim 16, wherein the fourth layer is sized and spaced, and the process of cutting the material along its length is coordinated with the sizing and spacing of the fourth layer, such that cutting the laminate material along its length does not include cutting the fourth layer.

* * * * *